United States Patent Office.

ELLISON BROWN, OF INDIANAPOLIS, INDIANA, ASSIGNOR TO HIMSELF AND JAMES B. BELL, OF CINCINNATI, OHIO.

Letters Patent No. 63,847, dated April 16, 1867.

IMPROVED COMPOSITION FOR COATING LEATHER.

*The Schedule referred to in these Letters Patent and making part of the same.*

TO ALL WHOM IT MAY CONCERN:

Be it known that I, ELLISON BROWN, of Indianapolis, in the county of Marion, and State of Indiana, have invented a new and useful Composition of Matter for Coating Leather and Metallic Surfaces; and I do hereby declare that the following is a full, clear, and exact description thereof, reference being had to the specimen of the ingredients, and to the specimen of the compound filed herewith.

The following description will enable others skilled in the art to prepare the compound.

My water-proof oil polish is compounded of ten pounds of asphaltum, one gallon of fish or neat's-foot oil, one gallon spirits turpentine, two and one-half pounds rosin, one pound of beeswax, and one-half pound lampblack. This is prepared by dissolving the asphaltum and rosin in the spirits turpentine by heating them in any suitable vessel over a slow fire, after which the lampblack, beeswax, and oil are added, and thoroughly incorporated by stirring while hot.

The compound is applied with a brush in the ordinary manner.

I may also state that I sometimes add about one-fourth pound of beef tallow to the above compound when used for harness.

Having thus fully described my invention, what I claim, and desire to secure by Letters Patent, is—

The water-proof oil polish compounded of the ingredients named, or their chemical equivalents, in the manner and for the purpose substantially as set forth.

In testimony whereof I have hereunto subscribed my name in the presence of two subscribing witnesses.

ELLISON BROWN.

Witnesses:
   O. F. MAYHEW,
   H. LINDLEY.